United States Patent [19]
Grinshpun et al.

[11] Patent Number: 5,807,514
[45] Date of Patent: Sep. 15, 1998

[54] MANUFACTURING OF FOAM-CONTAINING COMPOSITES

[75] Inventors: Vyacheslav S. Grinshpun; Kevin J. Spoo, both of Granville; Byron Hulls, Reynoldsburg, all of Ohio

[73] Assignee: Owens-Corning Fiberglas Technology, Inc., Summit, Ill.

[21] Appl. No.: 677,692

[22] Filed: Jul. 10, 1996

[51] Int. Cl.[6] .......................... B29C 44/06; B29C 44/20
[52] U.S. Cl. .................. 264/46.6; 264/45.8; 264/46.7; 264/255; 264/257; 264/267; 264/328.8
[58] Field of Search .................... 264/46.6, 46.7, 264/45.5, 46.9, 255, 267, 269, 257, 45.8, 328.8

[56] References Cited

U.S. PATENT DOCUMENTS

| | | |
|---|---|---|
| 3,533,901 | 10/1970 | Sutker . |
| 3,556,888 | 1/1971 | Goldsworthy . |
| 3,895,087 | 7/1975 | Ottinger et al. . |
| 3,895,896 | 7/1975 | White et al. . |
| 3,968,561 | 7/1976 | Oakes et al. ........................ 264/45.5 |
| 4,576,855 | 3/1986 | Okina et al. . |
| 4,645,710 | 2/1987 | Baitinger et al. . |
| 4,773,448 | 9/1988 | Francis .............................. 264/45.5 |
| 4,774,794 | 10/1988 | Grieb . |
| 5,013,508 | 5/1991 | Troester ............................ 264/46.6 |
| 5,106,547 | 4/1992 | Beck et al. ........................ 264/46.6 |
| 5,116,557 | 5/1992 | Debaes et al. ..................... 264/46.6 |
| 5,142,835 | 9/1992 | Mrocca . |
| 5,173,227 | 12/1992 | Ewen et al. ....................... 264/46.6 |
| 5,286,320 | 2/1994 | McGrath et al. . |
| 5,529,731 | 6/1996 | Bendick et al. ................... 264/46.9 |
| 5,608,957 | 3/1997 | Hanagan .......................... 264/46.6 |
| 5,653,923 | 8/1997 | Spoo et al. ........................ 264/46.1 |

FOREIGN PATENT DOCUMENTS

| | | | |
|---|---|---|---|
| 3438448 | 4/1986 | Germany . | |
| 53-147766 | 12/1978 | Japan ............................... | 264/46.6 |
| 61-125836 | 6/1986 | Japan ............................... | 264/46.6 |

*Primary Examiner*—Allan R. Kuhns
*Attorney, Agent, or Firm*—C Michael Gegenheimer; Ted C. Gillespie

[57] ABSTRACT

In a method of making a linear composite member, a hollow carrier is provided having a cavity and an inner surface. A curable liquid or gelled resin is applied to the inner surface. A curable foam is introduced into the cavity. The foam contacts the resin when the resin is not more than partially cured, and preferably when the resin has a viscosity not greater than 250,000 centipoise at 25° C. The foam and resin, which are preferably both polyurethanes, are cured together to form a linear composite member having a foam core and a hard resin skin formed integrally. In a preferred embodiment, a reinforcement material, such as a glass fiber web, is embedded in the resin skin.

15 Claims, 4 Drawing Sheets

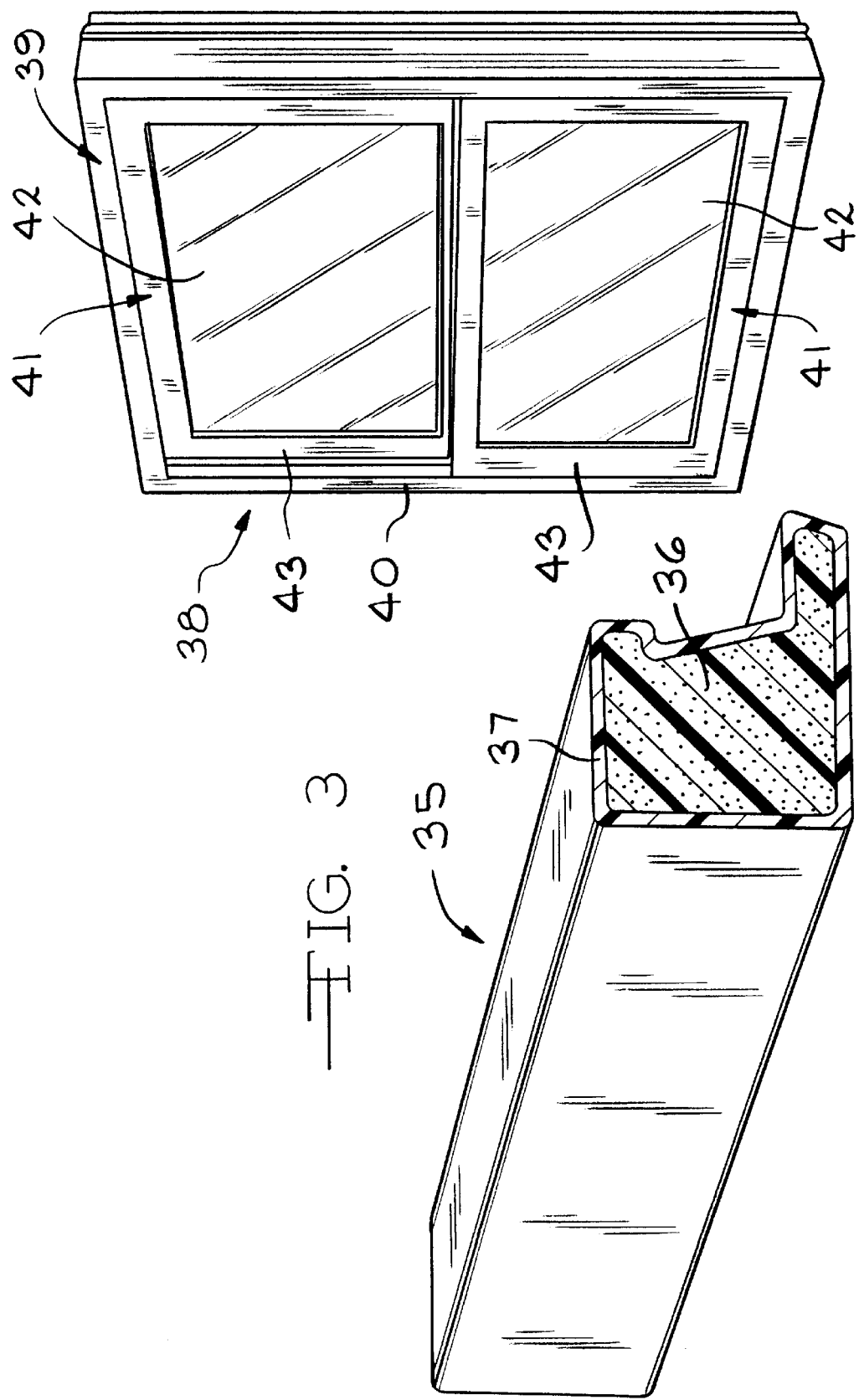

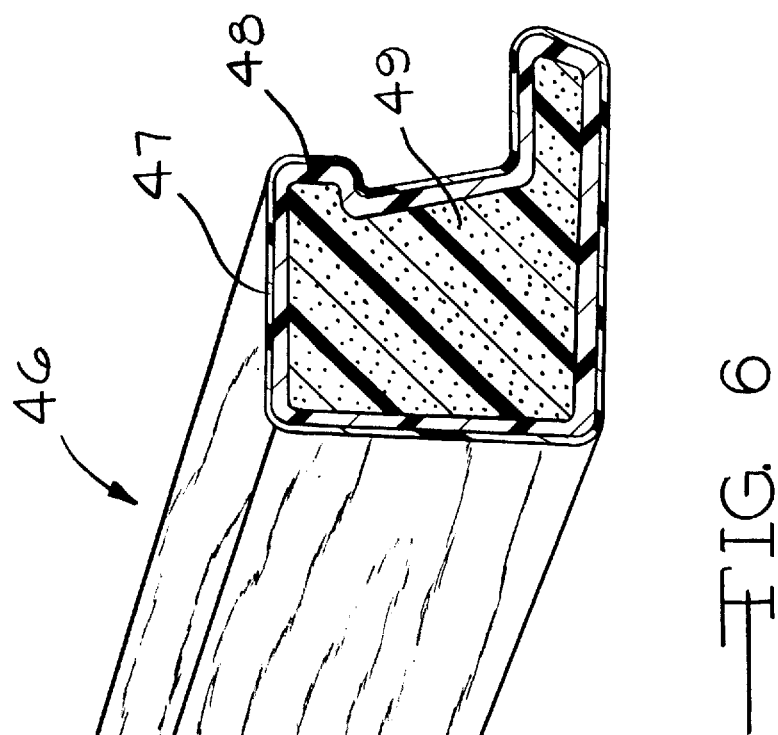
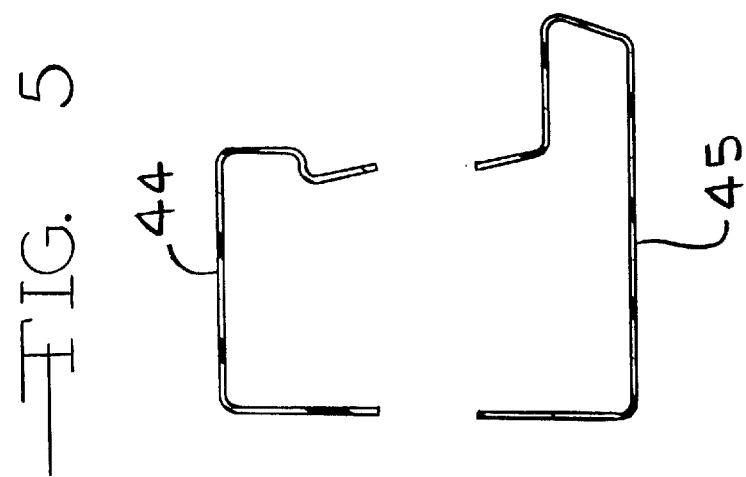

MANUFACTURING OF FOAM-CONTAINING COMPOSITES

FIELD AND INDUSTRIAL APPLICABILITY OF INVENTION

This invention relates in general to a method of making a linear composite member having a foam core and a hard resin skin. More specifically, the invention relates to an economical method of making such a composite member in a convenient process. The method produces a composite member in which the resin skin is strongly bonded to the foam core. The composite member has industrial applicability, e.g., as an insulating structural component.

BACKGROUND OF INVENTION

Linear composite members having a foam core and a hard resin skin are useful in a wide variety of applications. The hard resin skin provides strength to the composite member so that it can be used as a structural component. Because of the foam core, the composite member is lightweight and provides thermal and acoustical insulating properties. Depending on the application, the composite member can have a simple or complex cross-sectional shape. The composite members can be used, for example, as components of windows, doors, wall panels, or roofs, as building panels or structural panels for use in the construction industry, as siding material for buildings, or as structural panels for vehicles.

Various methods have been employed to manufacture such composite members. In a typical method of manufacturing a composite, a foam core is first preformed and cured in a foam die. Then the foam core is transported to a coating chamber where a liquid resin is applied and allowed to cure. Then the composite member is cut into pieces of the desired length. This method suffers from the disadvantage that it requires a series of time-consuming operations to produce the composite member. As a result, the method may not be as economical as a simpler method. Another disadvantage is that the resin applied to the foam core may not strongly bond to the core. If the resin skin comes loose from the foam core, the composite member is less suitable for its intended application.

Other methods are known for forming composites, e.g., U.S. Pat. Nos. 3,533,901 to Sutker, 3,556,888 to Goldsworthy, 3,895,087 to Ottinger et al., 3,895,896 to White et al., 4,645,710 to Baitinger et al., and 5,142,835 to Mrocca disclose various methods for forming composites. However, such known methods suffer from various drawbacks. For example, some known methods require the separate formation of the core and skin materials or layers of the composite, as in the Baitinger et al. and Mrocca patents, where a facing sheet or a resin-impregnated fibrous mat is adhered to the outer surface of a foam core. As an alternative to laminating a film onto a supporting substrate or core, the Ottinger patent describes a molding technique where a urethane foam core is molded onto a preformed plastic film.

Thus, it would be desirable to provide a method of making a linear composite member which is simple, less time-consuming, and economical, which produces a composite member having a strong bond between the resin skin and the foam core.

SUMMARY OF INVENTION

An object of the invention is to provide a convenient and economical method of preparing a linear composite. Another object is to produce a linear composite member having a resin skin and a foam core, with a strong bond between the skin and core. An additional object of this invention is to provide a method that may be used to conveniently form composite members of a variety of shapes. These and other objects have now been attained through advantageous methods of making linear composite members according to the invention.

In one aspect, the invention relates to a method of making a linear composite member comprising the steps of: providing a hollow carrier comprising a cavity and an inner surface; applying a curable liquid or gelled resin to the inner surface; introducing a curable foam into the cavity so that the foam contacts the resin when the resin is not more than partially cured; and curing the foam and resin together to produce a linear composite member comprising a foam core and a hard resin skin formed integrally. In another aspect, the invention relates to a method of making a linear composite member comprising the steps of: providing a hollow carrier comprising a cavity and an inner surface; applying a curable liquid or gelled polyurethane resin to the inner surface; introducing a curable foam into the cavity so that the foam contacts the resin when the resin has a viscosity within the range from about 50,000 centipoise to about 100,000 centipoise at 25° C.; and curing the foam and resin together to produce a linear composite member having a foam core and a hard resin skin formed integrally as an outer layer or skin.

In a preferred embodiment, the foam contacts the resin when the resin is not more than about 80% cured. The curing is preferably conducted at room temperature. The resin skin may be advantageously covalently bonded to the foam core and form an interpenetrating network with the foam core.

A preferred resin is a polyurethane. Preferably, the foam is selected from polyurethanes, isocyanurates, phenolics, polyimides, epoxies, and mixtures thereof. More preferably, the foam is a fast-curing urethane or isocyanate. Polyurethane foams are particularly preferred.

Preferably, the carrier is a release material selected from papers and films (e.g., polymeric films), which is positioned inside a mold. Another preferred material for the carrier is a wood veneer. In a preferred embodiment, the carrier is retained as an outer surface on the linear composite member. Preferably, the steps of applying the resin and introducing the foam comprise discharging the foam or resin through separate outlets of an injection apparatus that moves relative to the carrier.

More specifically, in one preferred embodiment of the invention, a hollow carrier is provided having a cavity and an inner surface. A curable liquid resin is applied to the inner surface. A curable foam is introduced into the cavity. The foam contacts the resin when the resin is not more than partially cured, and preferably when the resin has a viscosity not greater than about 250,000 centipoise at 25° C. The foam and resin are cured together to produce a linear composite member having a foam core and a hard resin skin formed integrally together. Because the resin is not more than partially cured when contacted by the foam, an intimate, continuous bond is formed between the resin skin and the foam core. A reinforcement, which is of a material preferably permeable to the resin, is positioned or embedded in the resin skin.

The invention also relates to linear composite members made according to the described methods. These linear composite member can be used as components of windows, doors, or roofs, as structural panels for buildings or vehicles, as siding materials for buildings, as synthetic lumber, and in many other applications. The composite member can have a simple or complex cross-sectional shape depending on the application. A preferred composite member is used as a window lineal, such as a frame or sash.

An advantage of the invention is that the composite member may be produced in a single operation rather than a series of operations, and therefore the method is simple and economical. The resin skin is formed first and the foam core is formed immediately afterward in the same operation. There is no waste of foam materials when making a complex shape.

BRIEF DESCRIPTION OF DRAWINGS

FIG. 3 is a perspective view of a composite member in the form of a window lineal made according to the method of the invention.

FIG. 4 is a perspective view of a double-hung window frame and sash constructed of window lineals in accordance with the invention.

FIG. 5 is an enlarged sectional view in elevation of complementary wood veneer pieces suitable for combining as a carrier for an alternate embodiment of a window lineal.

FIG. 6 is a perspective view of a window lineal having a wood grain finish made using the wood veneer carrier of FIG. 5.

DETAILED DESCRIPTION AND PREFERRED EMBODIMENTS OF INVENTION

Figure 1:
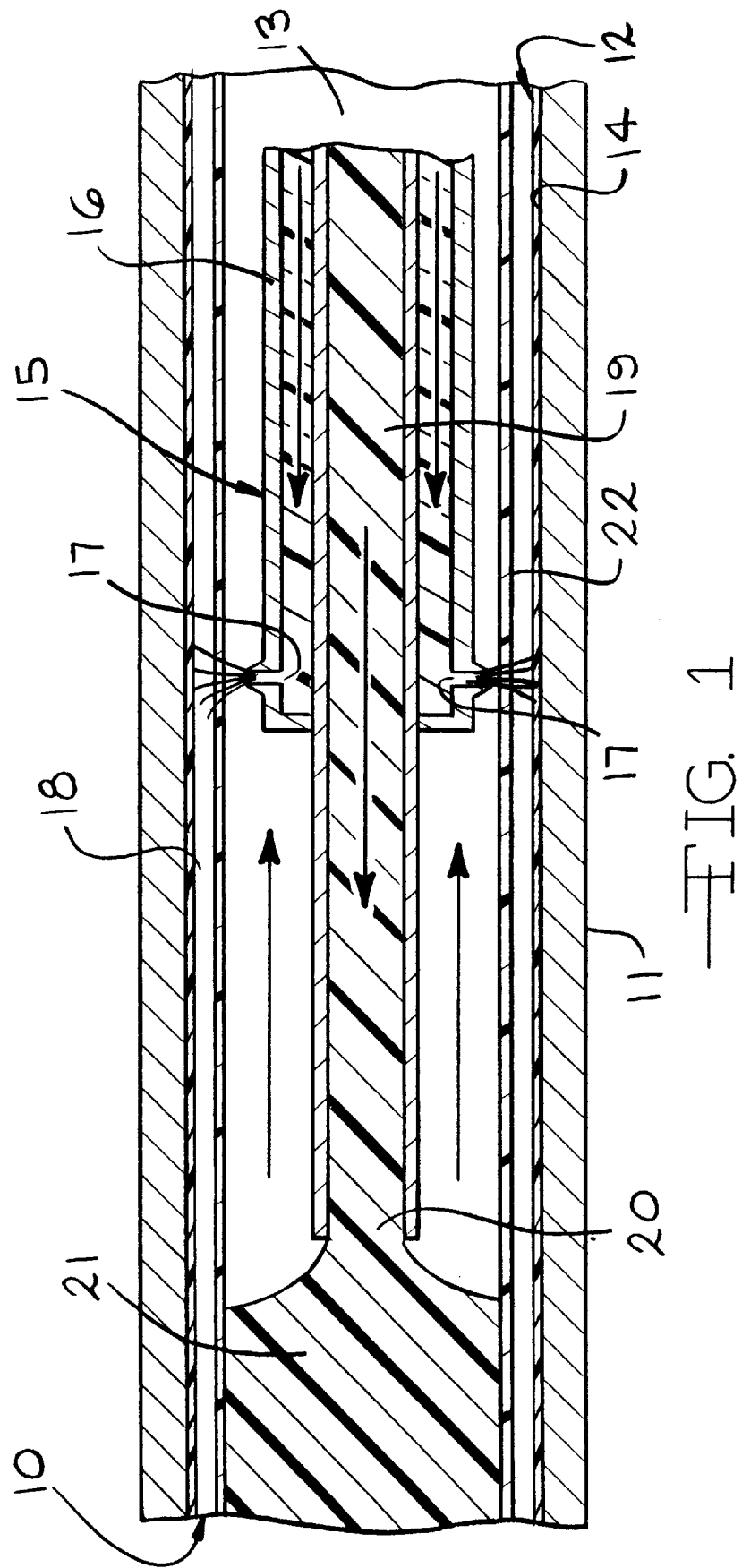
FIG. 1 is a schematic sectional view in elevation of an apparatus for making a linear composite member according to the method of the invention.

Referring now to the drawings, there is illustrated in FIG. 1 a method of making a linear composite member 10 in accordance with this invention. The method will be described with reference to preferred apparatus and materials. It is to be understood, however, that the invention can also apply to other types of apparatus and materials.

In the illustrated method, a die or mold 11 is provided having the desired configuration of the composite member. A hollow carrier 12 is positioned inside the die so that it takes the shape of the die. The carrier has a cavity 13 and an inner surface 14. The carrier can be any material capable of forming the desired configuration of the composite member. For example, the carrier can be a release paper such as silicone release paper, a release film, a decorative paper, a decorative plastic, or a combination of these materials. When the carrier is a release material or other relatively non-rigid material, preferably the carrier is positioned inside a guide or die as shown to preserve the configuration until completion of the method. A die is usually unnecessary when the carrier is a strong, rigid material such as a heavy vinyl. The carrier can be removed at the completion of the method, or it can be retained on the composite member as an outer layer such as a decorative facing. In another embodiment of the invention, the method can be conducted without a release material or other carrier material by using the die as a carrier.

The configuration of the carrier can be simple or complex depending on the configuration of the composite member. Preferably, the carrier is a release paper in the complex shape of a window lineal which will be described below. The method is very cost efficient because there is no waste of foam materials when making a complex shape. The cross-sectional shape can be generally rectangular, round, or any other desired shape. The inner surface of the carrier can have a pattern such as a wood grain pattern which will be transferred to the resin when it is applied to the carrier.

A curable resin is applied to the inner surface 14 of the carrier. For purposes of this invention, the resin may be in a liquid or gelled state. The resin can be applied in any manner, such as spraying or wiping, so that it lines the inner surface. In the illustrated embodiment, the resin is applied by use of an injection apparatus 15. The apparatus comprises a pair of elongated concentric tubes, which are preferably formed of metal. The outer tube having a closed end is a resin conduit 16 through which the resin is supplied. Preferably, the resin is supplied under pressure by pumping it from a storage tank (not shown). If the resin is a two-component material such as a polyurethane resin, the two components can be stored in separate tanks and combined in line immediately prior to application to the carrier. Also, the resin may be initially in a solid form and heated, e.g., in a storage tank, to liquefy it before application.

Figure 2:
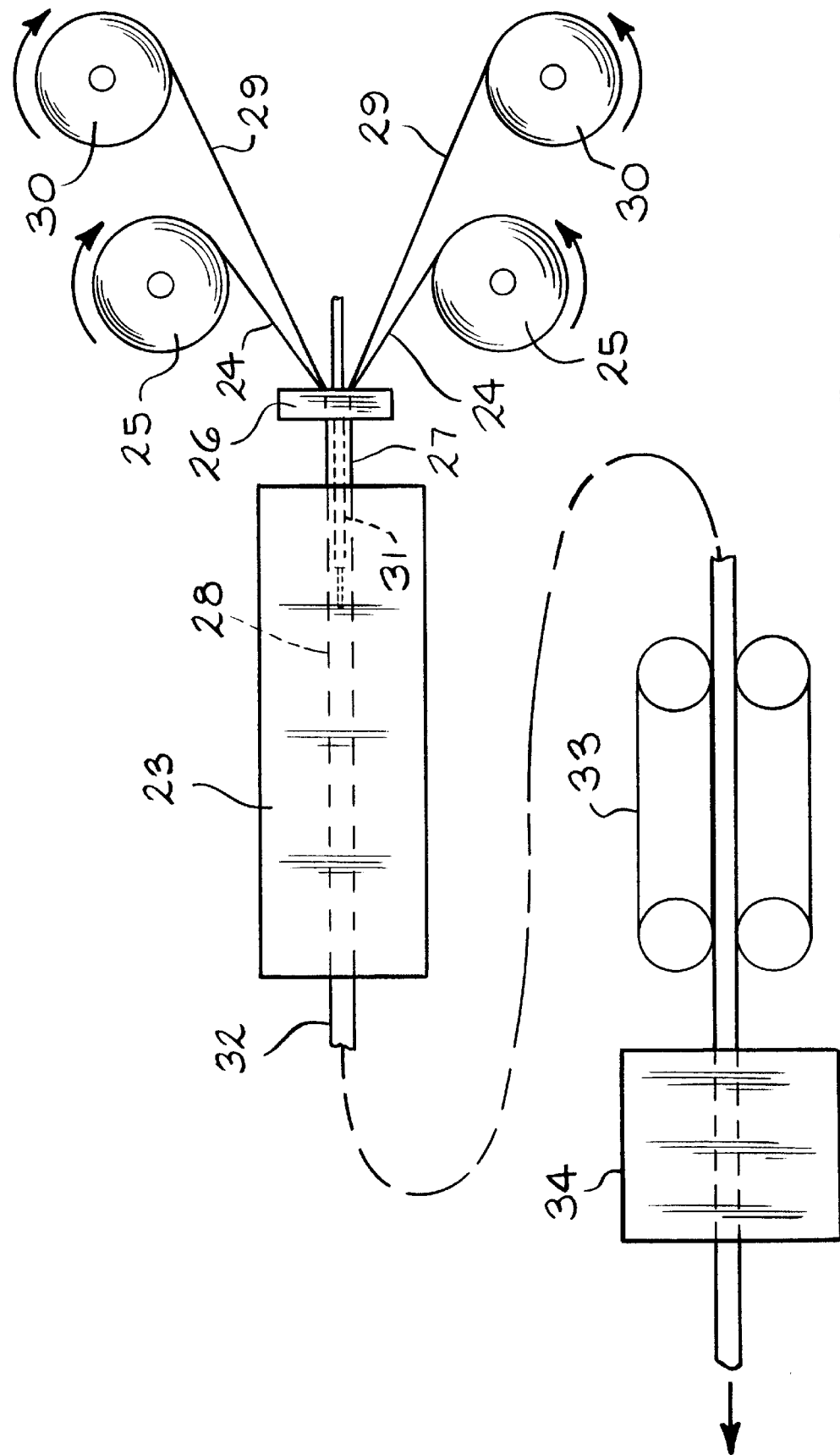
FIG. 2 is a schematic view in elevation of an alternate embodiment of an apparatus for making a linear composite member according to the method of the invention.

A plurality of resin discharge outlets 17 are positioned near the end of the resin conduit 16. The resin discharge outlets are formed around the circumference of the resin conduit so that resin 18 is discharged radially outward from the conduit onto the inner surface 14 of the carrier. In a preferred embodiment, the conduit includes eight resin discharge outlets, two of which are shown. Preferably, the resin is discharged by spraying it through the resin discharge outlets. The discharge rate and amount can be adjusted using suitable means to obtain different resin thicknesses. Preferably the resin is applied so that the resulting resin skin has a thickness from about 0.5 mm to about 1 cm. To apply the resin, the injection apparatus 15 is inserted inside the cavity 13 so that the resin discharge outlets are positioned near one end of the carrier (the left end when viewing FIG. 1). Then the liquid resin is sprayed through the resin discharge outlets and the apparatus is drawn through the length of the cavity (to the right when viewing FIG. 1). As a result, the liquid resin is applied to the entire inner surface of the cavity. The carrier can be stationary and the apparatus can move relative to the carrier as shown by the arrows in FIG. 1, or the apparatus can be stationary while the carrier moves as shown in FIG. 2.

The resin can be selected from the group of structural thermoplastic and thermosetting resins. Polyurethanes, phenolics, polyesters, epoxies, vinyl esters, polyetherketones, polyetherimides, polyethersulphones, high-density polyethylenes (HDPEs), polycarbonates, acrylonitrile-butadiene-styrenes (ABSs), polypropylene (PPs), and nylon are, in general, suitable materials. The thermosetting polyesters are preferred due to their short cure time, relative chemical inertness and low cost. Preferably the resin is capable of curing to form a smooth skin and a hard finish on the finished composite member. Accelerating agents, compatabilizing agents, fillers, die release agents, second phases for toughening, and coloring agents can be added to the resin, as will be appreciated by those skilled in the art.

A highly preferred resin is a polyurethane. This resin has a short cure time at room temperature and it is readily sprayable. As known to persons skilled in the art, polyurethanes are produced by reacting an aromatic diisocyanate with a diol. An example of a preferred polyurethane is produced by the catalyzed reaction of methylene diphenyl diisocyanate (MDI) with glycerol.

The injection apparatus 15 further includes an inner tube which is a foam conduit 19. A curable foam is supplied through the foam conduit from any source. Preferably, the foam is supplied by feeding a foamable material from a storage tank (not shown). If the foam is a two-component material such as a polyurethane foam, the two components can be stored in separate tanks and combined in-line immediately prior to introduction. The foam conduit includes a foam discharge outlet 20 at its end for introduction of the foam into the carrier. The foam conduit 19 extends a distance past the end of the resin conduit 16.

When the foam 21 is introduced into the cavity 13 of the carrier, the apparatus is further drawn through the cavity (to the right when viewing FIG. 1). Because of the construction of the apparatus, the resin 18 is applied to the inner surface of the cavity prior to introduction of the foam. As the resin cures, the foam is introduced and expands into contact with the resin. The foam contacts the resin when the resin is not more than partially cured, preferably not more than about 80% cured. The partially cured resin is not solidified and is still tacky. Preferably the foam contacts the resin when the resin has a viscosity not greater than about 250,000 centipoise at 25° C., and more preferably not greater than about 100,000 centipoise at 25° C., as measured according to ASTM C965. Because the foam expands into contact with the partially cured resin, the foam and resin cure together and form a continuous, intimate bond between the resin skin and the foam core of the composite member. If the resin were completely cured when contacted by the foam, the foam and resin would not form as good a bond. Preferably the resin is at least partially cured when the foam contacts it so that it adheres well to the inner surface of the carrier, and more preferably it has a viscosity of at least about 50,000 centipoise at 25° C.

Other means besides the illustrated injection apparatus can also be used to introduce the foam so that it contacts the partially cured resin. If desired or necessary, electric heating coils or any other suitable means can be supplied to maintain the resin and foam at an elevated temperature during curing. Preferably, however, these materials are cured at room temperature.

The foam can be selected from any of the suitable foam materials known to persons skilled in the art. The foam can be a high density structural-type foam or a low density insulation-type foam. Preferably, the foam is selected from polyurethane foams, polyisocyanurate foams, phenolic foams, polyimide foams, epoxy foams, polyurea foams, polyolefin foams, polystyrene foams, and mixtures thereof. Polyurethane foams and polyisocyanurate foams are most preferred because they rapidly cure at room temperature. Rigid polyurethane foams are well known and are commonly prepared from organic polyisocyanates and organic polyols together with known blowing agents, surfactants, and catalysts. Phenolic foam is preferred for its low smoke generation in case of fire.

Optionally, one or more of a variety of chemical and physical blowing agents can be used to expand the foam, including but not limited to water, carbon dioxide, non-fluorinated hydrocarbons, and fluorinated hydrocarbons such as HCFCs (i.e., hydrochlorofluorocarbons, e.g., dichlorofluoroethane (HCFC 141b) and chlorodifluoroethane (HCFC 142b)) and HFCs (i.e., hydrofluorocarbons, e.g., 1-fluoro-2-trifluoroethane (HFC 134a) and 1-difluoroethane (HFC 152a)). Such blowing agents are available from Allied Signal, Elf Atochem, and DuPont.

To increase the stiffness and compressive strength of the composite member at low cost, fillers, such as sawdust, corn husks, glass waste, or silica, may be optionally added to the foam. Additives and supplemental agents can also be included, such as surfactants, catalysts, cell control agents, plasticizers, and fire retardants. The particular compositions of the foams may be selected from, e.g., known compositions, and the blending and mixing of the foam ingredients may be accomplished using means and techniques routinely selected by those skilled in the art.

In a particularly preferred embodiment, the composite member is formed with a polyurethane resin skin and a polyurethane foam core. When the resin and foam are cured together, they react to form an intimate continuous bond due to the formation of urethane linkages between the isocyanates in the foam formulation and the polyols in the resin formulation, and vice-versa. In general, when the resin and foam are materials that can react with each other, curing the materials together allows the formation of covalent bonds. When the resin and foam cannot react with each other, the bond formed is usually an interpenetrating network.

If desired, a reinforcement material 22 can be embedded in the resin skin. The reinforcement material is usually positioned inside the carrier before applying the liquid resin. In such a case, the reinforcement material should be permeable to the liquid resin so that the resin penetrates the reinforcement material to the inner surface of the carrier.

A variety of materials can be used as the reinforcement material. The reinforcement material can comprise any combination of rovings, mats, woven fabrics, or veils composed of fibers such as glass fibers, aramid fibers, carbon fibers, graphite fibers, or ceramic fibers. Preferably the reinforcement material is a web made from polyester or glass fiber.

FIG. 2 illustrates a preferred continuous method of making a linear composite member in accordance with this invention, in which the injection apparatus is stationary and the carrier moves relative to the apparatus. A die 23 is provided having the desired configuration of the composite member. Two sheets of a carrier 24 such as a release film are pulled from upper and lower carrier rolls 25. The carrier sheets are pulled through an opening of a former 26 which folds the sheets together so that they form the desired shape of the carrier. The carrier is then pulled around a mandrel 27 which shapes and positions the carrier for entering the die cavity 28. Similarly, two sheets of a reinforcement material 29 such as a glass fiber mat are pulled from upper and lower reinforcement material rolls 30, through the opening of the former and around the mandrel. The reinforcement material sheets are positioned inside the carrier sheets to provide a structure of an outer carrier and a reinforcement material near the inner surface of the carrier. An injection apparatus 31 like that illustrated in FIG. 1 is positioned through the former and the mandrel and extends into the die cavity. As the carrier and reinforcement material are pulled through the die cavity, the injection apparatus sprays a liquid resin onto the inner surface of the carrier and then introduces a foam inside the carrier. The resin is partially cured when it is contacted by the foam. The resin and foam are cured together inside the die to form a composite member 32 having a hard resin skin and a foam core. The composite member is pulled by any suitable traction or pulling device, such as traction drive 33. Subsequently, the composite member can be cut by any suitable means such as cutter 34 into desired lengths. A finish such as paint and a finish coat can be applied, if desired.

FIG. 3 illustrates a preferred composite member in the form of a window lineal 35 made according to the invention. It can be seen that the window lineal includes a foam core 36 and a hard resin skin 37 formed integral with the core. FIG. 4 shows a window 38 in which a lineal such as illustrated in FIG. 3 can be incorporated. The window includes a generally rectangular frame 39. When installed in a building, the frame is stationary and positioned in an opening in a wall of the building. The frame is comprised of four linear or lineal members 40. The window also includes two generally rectangular sashes 41 positioned inside the frame. Each sash holds a pane 42 and is slidable up and down to open and close the window. Each sash is comprised of four linear or lineal members 43.

FIGS. 5 and 6 illustrate an alternate embodiment of a composite member in which the carrier is a wood shell such as a wood veneer which is retained as an outer surface on the composite member. The wood veneer surface is very attractive and thus desirable for use on building exteriors. Complementary first and second wood veneer pieces 44 and 45 are assembled into a carrier similar to that shown in FIG. 1, or they can be pulled from rolls similar to the method shown in FIG. 2. A resin is applied to the inner surface of the carrier and a foam is introduced into the cavity of the carrier. The resin and foam cure together and form an intimate bond. As shown in FIG. 5, the result is a composite member in the form of a window lineal 46, having an outer surface 47 of wood veneer, a hard resin skin 48, and a foam core 49.

Exemplary resin and foam formulations are described below.

Resin Formulation

A resin for use in the invention is prepared by combining the following ingredients (in parts by weight):

75 glycerol ("Alkapol SOR 490" available from Rhone Poulenc)
0.2 catalyst ("Dabco T9" available from Air Products)
75 methylene diphenyl diisocyanate (MDI) ("Mondur MR" available from Miles)

The glycerol and catalyst are mixed together at room temperature. Then the MDI is mixed with the glycerol and catalyst immediately prior to application of the resin.

Foam Formulations

A foam for use in the invention is prepared by combining the following ingredients (in parts by weight):

65 sucrose/amine polyol ("Voranol 360" available from Dow Chemical, having a hydroxyl number of 360)
27.7 polyol ("Alkapol XAP 440" available from Rhone Poulenc, having a hydroxyl number of 440)
5.0 amine polyol ("Alkapol 770" available from Rhone Poulenc, having a hydroxyl number of 770)
0.6 water
1.0 silicone surfactant ("Dabco DC5357" available from Air Products)
0.7 catalyst ("Dabco 33-LV" available from Air Products)
100 polymeric isocyanate ("Mondur MR" available from Miles Laboratories)

An alternate embodiment of a foam is prepared from the following ingredients (in parts by weight):

16.5 polyol flame retardant ("Saytex FR 1138" available from Albemarle)
24.8 amine polyol (AMG having a hydroxyl number of 370) ("Voranol 370" available from Dow Chemical)
24.0 glycerine polyol ("Terate 203" available from Cape Industries)
6.8 glycerine polyol ("Alkapol 6240" available from Rhone Poulenc, having a hydroxyl number of 240)
1.2 water
1.0 silicone surfactant ("Dabco DC5357")
0.7 dimethylcyclohexylamine (DMCHA) ("Polycat 8" available from Air Products)
7.0 trichlorofluoromethane ("CFC 11" available from Elf Atochem)
82.7 polymeric isocyanate ("Mondur MR" available from Miles Laboratories)

In preparing the foams, all the ingredients except the polymeric isocyanate are mixed together at room temperature. Then the isocyanate is mixed with the other ingredients just prior to introduction of the foam into the carrier.

The above detailed description and preferred embodiments and features have been provided to illustrate the invention. Obvious modifications will become apparent to those skilled in the art. Thus, the invention should be understood as not being limited by the foregoing description, but as being defined by the appended claims and their equivalents.

What is claimed is:

1. A method of making a linear composite member comprising:

providing a hollow linear carrier having closed elongated sides and open ends, the sides having an inner surface which surrounds a cavity;

applying a curable liquid or gelled resin onto the inner surface to form a resin layer covering the inner surface;

subsequently introducing a curable foam into the cavity so that the foam fills the cavity and contacts the resin layer when the resin is not more than partially cured; and curing the foam and resin together to produce a linear composite member comprising a foam core having elongated sides and a hard resin skin surrounding the sides of the core and formed integrally with the core.

2. A method according to claim 1, in which the resin is a liquid resin and the foam contacts the resin layer when the resin is not more than about 80% cured.

3. A method according to claim 1, in which the resin is a polyurethane, and the foam is selected from the group consisting of polyurethanes, isocyanates, phenolics, polyimides, epoxies, and mixtures thereof.

4. A method according to claim 1, in which the carrier is a release material selected from the group consisting of paper and film, and the release material is positioned inside a mold.

5. A method according to claim 1, in which the carrier is a wood veneer which is retained as an outer surface on the linear composite member.

6. A method of making a linear composite member comprising:

providing a hollow linear carrier having closed elongated sides and open ends, the sides having an inner surface which surrounds a cavity;

applying a curable liquid or gelled resin onto the inner surface to form a resin layer covering the inner surface;

subsequently introducing a curable foam into the cavity so that the foam fills the cavity and contacts the resin layer when the resin is not more than partially cured, the application of the resin and the introduction of the foam being performed together in a continuous operation; and curing the foam and resin together to produce a linear composite member comprising a foam core having elongated sides and a hard resin skin surrounding the sides of the core and formed integrally with the core.

7. A method according to claim 6, in which the resin is a polyurethane, and the foam is selected from the group consisting of polyurethanes, isocyanates, phenolics, polyimides, epoxies, and mixtures thereof.

8. A method according to claim 6, in which the application of the resin and the introduction of the foam comprises discharging the foam and resin through separate outlets of an injection apparatus that moves relative to the carrier.

9. A method according to claim 6, in which the carrier is pulled through a die, and the resin is applied and the foam is introduced inside the die.

10. A method according to claim 6, in which the resin is applied to produce a skin having a thickness within the range from about 0.5 millimeter to about 1 centimeter.

11. A method according to claim 6, in which the carrier is a wood veneer which is retained as an outer surface on the linear composite member.

12. A method according to claim 6, in which the curing is conducted at room temperature.

13. A method of making a linear composite member comprising:

providing a hollow linear carrier having closed elongated sides and open ends, the sides having an inner surface which surrounds a cavity;

positioning a permeable reinforcement sheet inside the carrier, the reinforcement sheet generally conforming to the inner surface of the carrier and spaced a short distance from the inner surface;

applying a curable liquid or gelled resin through the reinforcement sheet onto the inner surface of the carrier, to form a resin layer covering the inner surface and reinforced by the reinforcement sheet;

introducing a curable foam into the cavity so that the foam fills the cavity and contacts the resin layer when the resin is not more than partially cured; and curing the foam and resin together to produce a linear composite member comprising a foam core having elongated sides and a hard resin skin surrounding the sides of the core and formed integrally with the core.

14. A method according to claim 13, in which the reinforcement sheet is a web of polyester or glass fiber.

15. A method according to claim 13, in which the application of the resin and the introduction of the foam are performed together in a continuous operation.

* * * * *